(12) United States Patent
Ciocarlie et al.

(10) Patent No.: US 11,689,544 B2
(45) Date of Patent: Jun. 27, 2023

(54) INTRUSION DETECTION VIA SEMANTIC FUZZING AND MESSAGE PROVENANCE

(71) Applicant: SRI International, Menlo Park, CA (US)

(72) Inventors: Gabriela Ciocarlie, New York, NY (US); Michael E. Locasto, Lebanon, NJ (US); Cherita Corbett, Rockville, MD (US); Dejan Jovanovic, Brooklyn, NY (US)

(73) Assignee: SRI INTERNATIONAL, Menlo Park, CA (US)

( * ) Notice: Subject to any disclaimer, the term of this patent is extended or adjusted under 35 U.S.C. 154(b) by 8 days.

(21) Appl. No.: 16/085,199

(22) PCT Filed: Mar. 15, 2017

(86) PCT No.: PCT/US2017/022418
§ 371 (c)(1),
(2) Date: Sep. 14, 2018

(87) PCT Pub. No.: WO2017/160913
PCT Pub. Date: Sep. 21, 2017

(65) Prior Publication Data
US 2019/0089722 A1 Mar. 21, 2019

Related U.S. Application Data

(60) Provisional application No. 62/318,420, filed on Apr. 5, 2016, provisional application No. 62/308,563, filed on Mar. 15, 2016.

(51) Int. Cl.
*G06F 21/55* (2013.01)
*H04L 67/12* (2022.01)
(Continued)

(52) U.S. Cl.
CPC ........ *H04L 63/1416* (2013.01); *G06F 21/552* (2013.01); *G06F 21/554* (2013.01);
(Continued)

(58) Field of Classification Search
CPC . H04L 63/1416; H04L 63/1408; H04L 67/22; H04L 67/12; G06F 21/552; G06F 21/554
See application file for complete search history.

(56) References Cited

U.S. PATENT DOCUMENTS 10,078,317 B2 * 9/2018 Houmb ............... H04L 63/1433
10,692,032 B2 * 6/2020 Datta Ray ........... H04L 63/1408
(Continued)

FOREIGN PATENT DOCUMENTS

| CN | 104899513 A | 9/2015 |
|---|---|---|
| WO | WO-2001017169 A2 * | 3/2001 |
| WO | WO2017/160913 A1 | 9/2017 |

OTHER PUBLICATIONS

Man-Ki Yoon, et al., "Communication pattern monitoring: Improving the utility of anomaly detection for industrial control systems", 2014, SENT, pp. 1-10. (Year: 2014).*

(Continued)

*Primary Examiner* — Daniel B Potratz
(74) *Attorney, Agent, or Firm* — Shumaker & Sieffert, P.A.

(57) ABSTRACT

Intrusion detection systems and methods monitor legal control messages in an operational control system to detect subtly malicious sequences of control messages with undesirable emergent effects on devices in the operational control system. A message provenance component may investigate system-level correlations between messages rather than detecting if individual messages are anomalous. A semantic fuzzing component may search, based on the operational effect of candidate message sequences, the space of legal (Continued)

messages for sequences that cause actual harm. Behavior oracles may be used to test message sequences to identify sequences that induce drift towards a failure state. The intrusion detection system is able to prevent harm and disruption arising from control messages that individually appear legitimate and benign but that, in combination with other messages, can cause undesirable outcomes.

24 Claims, 6 Drawing Sheets

(51) Int. Cl.
*H04L 9/40* (2022.01)
*H04L 67/50* (2022.01)

(52) U.S. Cl.
CPC ........ *H04L 63/1408* (2013.01); *H04L 67/535* (2022.05); *H04L 67/12* (2013.01)

(56) References Cited

U.S. PATENT DOCUMENTS

| | | | | |
|---|---|---|---|---|
| 11,093,606 B2* | 8/2021 | Arov | ................ | H04L 67/12 |
| 2005/0243729 A1* | 11/2005 | Jorgenson | ............... | H04L 43/16 |
| | | | | 370/235 |
| 2009/0077277 A1* | 3/2009 | Vidal | .................. | G06F 1/3253 |
| | | | | 710/46 |
| 2013/0133026 A1 | 5/2013 | Burgess | | |
| 2015/0007138 A1 | 1/2015 | Sabetta | | |
| 2016/0063870 A1* | 3/2016 | Scheidt | ................. | G01R 31/00 |
| | | | | 701/3 |
| 2016/0224715 A1* | 8/2016 | Meyer | .................... | G06F 30/30 |
| 2018/0196941 A1* | 7/2018 | Ruvio | ................ | H04L 63/0227 |

OTHER PUBLICATIONS

Marco Caselli, et al., "Sequence-aware Intrusion Detection in Industrial Control Systems", 2015, CPSS'15, pp. 13-24. (Year: 2015).*

Spyros Kontogiannis, et al., "Hierarchical Oracles for Time-Dependent Networks", 2015, https://arxiv.org/abs/1502.05222v2, pp. 0-22. (Year: 2015).*

Junjie Yao, et al., "Provenance-based Indexing Support in Microblog Platforms", 2012, IEEE 28th International Conference on Data Engineering, pp. 558-569. (Year: 2012).*

Caselli, M. et al., "Sequence-aware Intrusion Detection in Industrial Control Systems", 2015, CPSS'15, pp. 13-24 (Year: 2015).*

International Searching Authority, "Search Report" in application No. PCT/US2017022418, dated May 30, 2017, 4 pages.

Federal Institute of Industrial Property, "Written Opinion" in application No. PCT/US2017/022418, dated Jun. 1, 2017, 2 pages.

The International Bureau of WIPO, "Search Report" in application No. PCT/US2017/022418, dated Sep. 18, 2018, 5 pages.

Current Claims in application No. PCT/US2017/022418, dated Sep. 2018, 4 pages.

* cited by examiner

INTRUSION DETECTION VIA SEMANTIC FUZZING AND MESSAGE PROVENANCE

CROSS REFERENCE TO RELATED APPLICATIONS

This application is a U.S. National Stage Patent Application filed under 35 U.S.C. § 371 of International Patent Application No. PCT/US17/22418 filed Mar. 15, 2017, which claims priority to U.S. Provisional Application Ser. No. 62/308,563 filed on Mar. 15, 2016, and U.S. Provisional Application Ser. No. 62/318,420 filed on Apr. 5, 2016 the entire contents of all of which are hereby incorporated by reference as if fully set forth herein for all purposes.

STATEMENT REGARDING FEDERALLY SPONSORED RESEARCH

Not applicable.

FIELD OF THE INVENTION

The invention relates generally to detection of intrusion by subtly malicious control messages and data packets in operational control systems, and more specifically, to the identification of threats involving legitimate-looking control and data messages that give rise to harmful, unpredictable, or otherwise undesirable emergent behaviors in, for example, the devices of industrial control systems.

BACKGROUND

Typical cyberattackers, as part of a cyber campaign, cyberwarfare, or cyberterrorism, may seek to introduce a malicious computer program ("malware") into a computing system for purposes of spying or causing damage or disruption to a target. Conventional intrusion detection software like firewalls monitor files for anomalous data that has been identified as being a threat. Skilled cyberattackers, on the other hand, may use messages that combine expected and allowed operations in novel and unanticipated ways to evade observation. Industrial control systems (ICSs) and operational technology (OT) systems are particularly susceptible. Carefully crafted sequences of legitimate-looking messages, which individually may be benign, can give rise to emergent behavior, and such unpredictable behavior may severely damage or destroy, for example, the ICSs that operate and monitor the energy grid. Existing methods of intrusion detection using signatures and content anomaly detection lack the ability to perceive the latent harm in such messages.

SUMMARY

Exemplary embodiments of intrusion detection and protection systems and methods (collectively, "systems") are able to monitor legal control messages in an operational control system (such as an industrial control system (ICS)) to identify subtly malicious sequences of control messages with undesirable emergent effects on devices in the control system. A message provenance component may investigate system-level correlations between messages rather than detecting if individual messages are anomalous. A semantic fuzzing component may search, based on the operational effect of candidate message sequences, the space of legal messages for sequences that cause actual harm. Behavior oracles may be used to test message sequences to identify sequences that induce drift towards a failure state. The intrusion detection system is able to prevent harm and disruption arising from control messages that individually appear legitimate and benign but that, in combination with other messages, can cause undesirable outcomes. Further advantages and features of the invention will be apparent from the remainder of this document, which discusses various exemplary implementations, in conjunction with the associated drawings.

Figure 1:
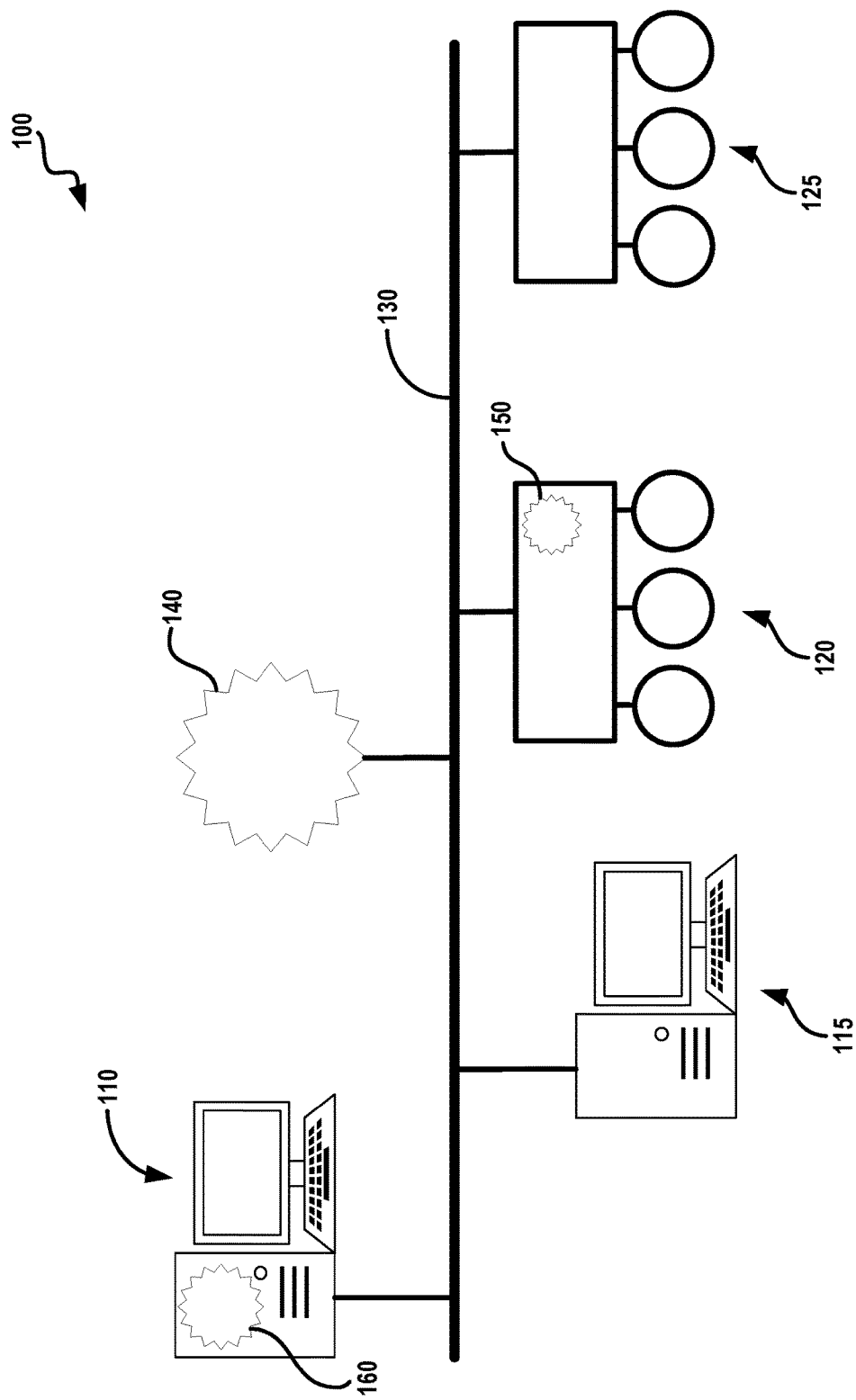
FIG. 1 illustrates several exemplary options for integration of exemplary detection systems in a control system.

The foregoing and other aspects and advantages of the invention will appear from the following description. In the description, reference is made to the accompanying drawings that form a part hereof, and in which there is shown by way of illustration preferred embodiments of the invention. Such embodiments do not necessarily represent the full scope of the invention, however, and reference is made therefore to the claims and herein for interpreting the scope of the invention.

DETAILED DESCRIPTION

Determining whether "legal" messages are benign or malicious poses an operational challenge in the effort to safeguard against cyberattacks. Legal messages are messages that are valid with respect to some specification. They may contain operationally valid commands and/or data that affect the operation of one or more devices in the system. Industrial control systems (ICSs), information technology (IT) systems, and operational technology (OT) systems, for example, those in the electrical power domain, can be targeted and exploited by legitimate-looking control and data messages. This is a class of attacks that differs from code-injection exploits against programmable logic controllers (PLCs) or supervisory workstations. The messages used are well-formed and contain valid parameters and field values; any single message may be completely legal in both syntax and semantics. However, the emergent properties of a set or sequence of such legitimate, well-formed messages can damage or disrupt a system. If any single message looks legitimate, traditional intrusion detection systems and firewalls will fail to match it against their signatures and rulesets. What is needed is an effective way to recognize and neutralize subtly malicious control and data messages.

Exemplary intrusion detection systems assess the effects of the message (or message sequences) with respect to normal operations of the system as a whole to identify deviations and undesirable behaviors. Gathering and representing system context provides "ground truth" about how the system is or should be operating. The intrusion detection system may, in exemplary implementations, involve: (1) gathering, representing, and analyzing system context, (2) mapping message provenance between groups of nodes, and (3) using semantic fuzzing to assess the actual impact current and future messages will have on the system. A challenge contemplated by gathering context is that, in the intrusion detection domain, "context" at any reasonable scale is often unstructured information. In exemplary implementations, formal methods may be used to model context as a set of constraints on various system properties. A challenge contemplated by mapping message provenance is that standard anomaly approaches fail because messages are not obviously anomalous. In exemplary implementations, the relationships between messages and message field values may be modeled, and system-level correlations between messages may be investigated, rather than detecting if individual messages are anomalous. And a challenge contemplated by semantic fuzzing is that typical fuzzing approaches focus on perturbing the syntax of messages or data; naive versions do this blindly, and more advanced ones use the program logic. In exemplary implementations, semantic fuzzing searches, based on the operational effect of the candidate message sequence, the space of legal messages for sequences that cause actual harm. As an overview, exemplary implementations of the semantic fuzzing approach treats fuzzing as a search problem through an input space. Semantic fuzzing may have a different evaluation function than prior fuzzing techniques. In certain configurations, the approach may involve building or modifying an existing ICS protocol fuzzer, formally verifying that the fuzzer conforms to the grammar or standard/specification, subsetting the fuzzer to delete generation rules for "illegal" transformations, and re-verifying. This can be used to continuously produce candidate message sequences with valid field values.

Referring to FIG. 1, a control system 100 may include control substations 110, 115 in communication with intelligent electronic devices (IEDs) 120, 125 via a substation local area network (LAN) 130 or other suitable communications channel or channels. The control system may be an ICS that is part of, for example, the energy infrastructure. The control substations 110, 115 may be used to distribute control functions in the control system 100, and the IEDs may be any machine or device that is controllable via one or more of the control substations 110, 115. In exemplary embodiments, an intrusion detection system could be deployed in multiple ways with respect to the control system 100. For example, the system could be implemented as an independent drop-in device 140 that is networked so that it is able to communicate with other components of the control system 100 via LAN 130. The independent drop-in device 140 could have one or more processors, and memory with instructions that are executed by the processors, to implement the intrusion detection scheme (e.g., context gathering, mapping message provenance, semantic fuzzing, reporting, etc.) that is suitable for the particular control system 100.

In alternative embodiments, the intrusion detection system could be integrated with a deployment process of an IED 150. That is, hardware, software, and/or firmware may be provided or added to one or more of the devices 120, 125 that are being controlled by one or more control substations 110, 115 in the control system 100. In such embodiments, the intrusion detection system could use the same communications channels available to the IEDs 120, 125 (or could be provided with additional communications channels if desired). In other exemplary embodiments, the intrusion detection system could be collocated 160 with a controller substation. Similar to the integration with IED option 150, hardware, software, and/or firmware may be provided or added to one or more of the control substations 110, 115 in the control system 100, and the same communications channels available to the substations 110, 115 could be used.

Additional features, details, and advantages will now be discussed in the context of certain exemplary embodiments capable of detecting and responding to crafted and subtle cyberattacks on, for example, energy ICSs or other control systems. Such exemplary embodiments focus on the particularly difficult challenge of identifying the latent harm in sequences of seemingly benign or normal communications. They may use (i) system-wide context encoding mechanisms, (ii) novel message provenance modeling techniques, and (iii) predictive semantic fuzzing processes, each of which will be discussed in more detail.

ICSs are inherently difficult to protect because they are targets to powerful adversaries who are capable of covert and subtle attacks. A significant threat arises from the emergent properties and latent behavior induced via carefully crafted sequences of well-formed, legal messages; both Stuxnet and the Ukraine incident (discussed below) included such control messages on the OT side of the attack. If there had there been sensing elements in these environments that were capable of reasoning about the effects of such "benign" messages and their inconsistencies with the broader operational context, such elements would have contributed system resilience and defense-in-depth. A key challenge arises from the difficulty of capturing and modeling arbitrary contextual information about a complex cyber-physical system.

Exemplary embodiments may be based on two key tenets. First, when individual commands are all legal and well-formed, it can still be determined whether a command sequence is malicious by examining the global, system-level state. A novel message provenance technique may be used to discover unstated system-level dependencies between ICS devices. Second, starting from a given state, the system may look into the future to identify unfolding command sequences that are likely to produce unexpected emergent behavior. This novel semantic fuzzing technique generates possible sequences of future commands and tests them against models of ICS behavior to determine if they result in an undesirable state. The system, in effect, uses the beginning of an attack to predict how it will unfold, using the attacker itself to help make such predictions.

Cyberattackers in this domain will have invested the time and effort to bypass traditional security measures, which are ill-equipped to contend with techniques for disguising these attacks, as they operate at too-fine a granularity (e.g., on a per-message basis), and are unable to properly collect, assess, and interpret the larger context of messages. ICS equipment operates with a great deal of context, including system settings (policy) and configuration (setpoints), current environmental parameters like load and time of day, maps of typical peer machines and standard information flows, and the physical properties, characteristics, and limitations of devices.

In exemplary embodiments, context information is modeled in a standardized, coherent fashion that enables the identification of advanced attack encodings. A foundation of the effort to counter subtle attacks is to gather this information and create effective models for distinguishing between legitimate inputs and attacks. This may be addressed by creating a context collection system for information such as configuration settings and physical properties to develop an initial representation of legitimate system behavior. Based on this data, message provenance may then be used to discover implicit dependencies and correlations from the patterns of communication among devices in a variety of settings (such as energy delivery devices that are part of the energy infrastructure).

The intrusion detection system preferably does not impede critical functions (such as energy delivery). To be non-disruptive, obtaining access to meaningful data and communications information should be balanced with the need to refrain from disturbing the operation of ICS devices. The flexibility to be deployed as a monitor of communications on an IT/OT subnet broadcast medium (in the case of protecting legacy devices) or integrated within new equipment to leverage on-board, independent, and compartmentalized computing capacity, facilitates striking an acceptable balance. A reporting capability in certain implementations may fuse raw detection information into actionable threat intelligence in a standard format, such as Structured Threat Information Expression (STIX)/Trusted Automated eXchange of Indicator Information (TAXII). This information will enable better targeting of existing remediation and recovery procedures toward the observed threat. The intrusion detection system enables asset owners to monitor risk, and vendors to develop measures to reduce risk of carefully crafted attacks that could drive systems to their operational edge (a state beyond which disruptive or damaging behaviors too likely). A focus on the interface between the cyber and physical layers can help prevent physical damage to equipment with potential cascading effects.

Exemplary embodiments of the intrusion detection system detect adversarial manipulation of components of control systems by targeting stealthy attacks based on clever arrangements of legal operations that ultimately lead to physical damage or other operational disruptions. Specifically targeted are attacks that combine expected, allowed operations, in novel or unanticipated ways to produce targeted, novel physical behavior that disrupts or destroys equipment. One application is energy delivery systems. Energy generation and delivery systems are vulnerable to, and have been targeted, by well-crafted cyberattacks aimed at both the commodity and ICS-specific parts of this infrastructure. Existing solutions use a traditional approach to network intrusion detection systems (IDS), which relies on pre-defined signatures to identify potential ICS attacks. However, such an approach is limited when faced with the zero-day attacks that have become prevalent in ICS. Such attacks can evade existing detection techniques by using legal control messages and data packets (referred to collectively as "control messages" or "control data") in unexpected ways. Such message combinations (which take into account temporal aspects, rates, sequences, and data combinations) can give rise to emergent behavior, and this unpredictable behavior can severely damage or destroy ICS energy equipment.

As an example, in 2009, Stuxnet emerged as a significant public example of this type of attack on ICS equipment. Its impact was significant: 1,000 out of 9,000 centrifuges at the Natanz Fuel Enrichment Plant were destroyed. Stuxnet used two different strategies to damage the centrifuge rotors: the first one aimed to over-pressurize the centrifuge, and the second to over-speed centrifuge rotors to lead them to resonance. Stuxnet's newest version infiltrated as a legitimate driver for Windows hosts, and is an example of legitimate messages and commands, with "legal" parameter values, that were used to slowly shift the system into a state that damaged the centrifuges. Critically, this attack was also designed to evade (or make irrelevant) normal safety precautions typically embedded in an ICS. For example, a sudden stop of a centrifuge could result in catastrophic damage, but if such a command were to be issued, the frequency converters would likely prohibit such a radical maneuver. A more subtle approach may be to instruct a centrifuge to slow down, resulting in the frequency converter to smoothly decelerate (like with an isolation/run-down event) and then to subsequently resume normal speed. Operating at or above certain speeds may cause the rotor to vibrate (if only briefly). When a rotor passes through such speeds, the harmonics may damage the rotor. Consequently, such changes in speed have a chance of causing damage, and with repetition over time, become more likely to damage the equipment. Notably, such an attack does not aim to produce catastrophic physical effects (which would likely be intercepted by existing safety bypasses and controls) directly. Instead, it seeks to induce catastrophic damage as a side effect of "normal" commands.

Another example of such an attack was the 2015 Ukrainian incident, where power companies experienced outages that affected 225,000 customers. Multiple breakers were tripped by the attackers. Though all the commands were legal, their sequencing led to severe physical consequences. In each of these cases, existing security measures failed because they were only afforded a local view of the system, limited in both scope and time. Interactions between different components and devices were unmonitored, and the effect of a specific command was not investigated beyond its immediate time horizon, in conjunction with the other commands in its sequence.

A foundational component of exemplary embodiments of the intrusion detection system is a context collection system, which involves collecting, representing, and storing global "context" for devices (equipment, machines, etc.) in the system (such as energy grid ICS devices). In this domain, context includes configurations, specification-based protocol models, architecture information, topology, a physical model (if available), etc. The intrusion detection system may use a model for representing this information in a standard, coherent fashion. The context collection system captures the system-wide context to support complementary message provenance and semantic fuzzing components/layers, both of which help identify abnormal communications: the former with respect to typical communications, and the latter with respect to induced physical behavior.

The context collection system facilitates the collection, normalization, and modeling of ICS context, allowing information to be extracted for system- and protocol-wide analysis. It helps establish a reliable, independent model of the system's legal operation as defined by operational settings and physical limitations. The message provenance system identifies legitimate/normal flows between devices and components to determine normal message sequences and their correlations at the system level. By moving beyond the consideration of individual messages or flows, the message provenance layer is able to capture correlation relationships between multiple pairwise connections across the network. The system moves beyond modeling individual ICS interactions to modeling device interactions at the system level. The semantic fuzzing system identifies potentially harmful sequences as they start developing by using state and context information to generate predictive command sequences and testing them against behavior oracles. The information produced by context modeling and message provenance can be used to generate and test predictive message sequences. These sequences will be generated by a semantic fuzzing component that uses a concrete seed to synthesize a sequence of valid messages, and then evaluates them against behavior oracles, which determine the system effect of the message sequence for the given real-time context. Advantageously, exemplary embodiments of the intrusion detection system can be integrated with existing industry standards and components for all system layers, including information collection, analysis, and reporting, providing actionable threat intelligence in a standard format (such as STIX/TAXII).

Figure 2:
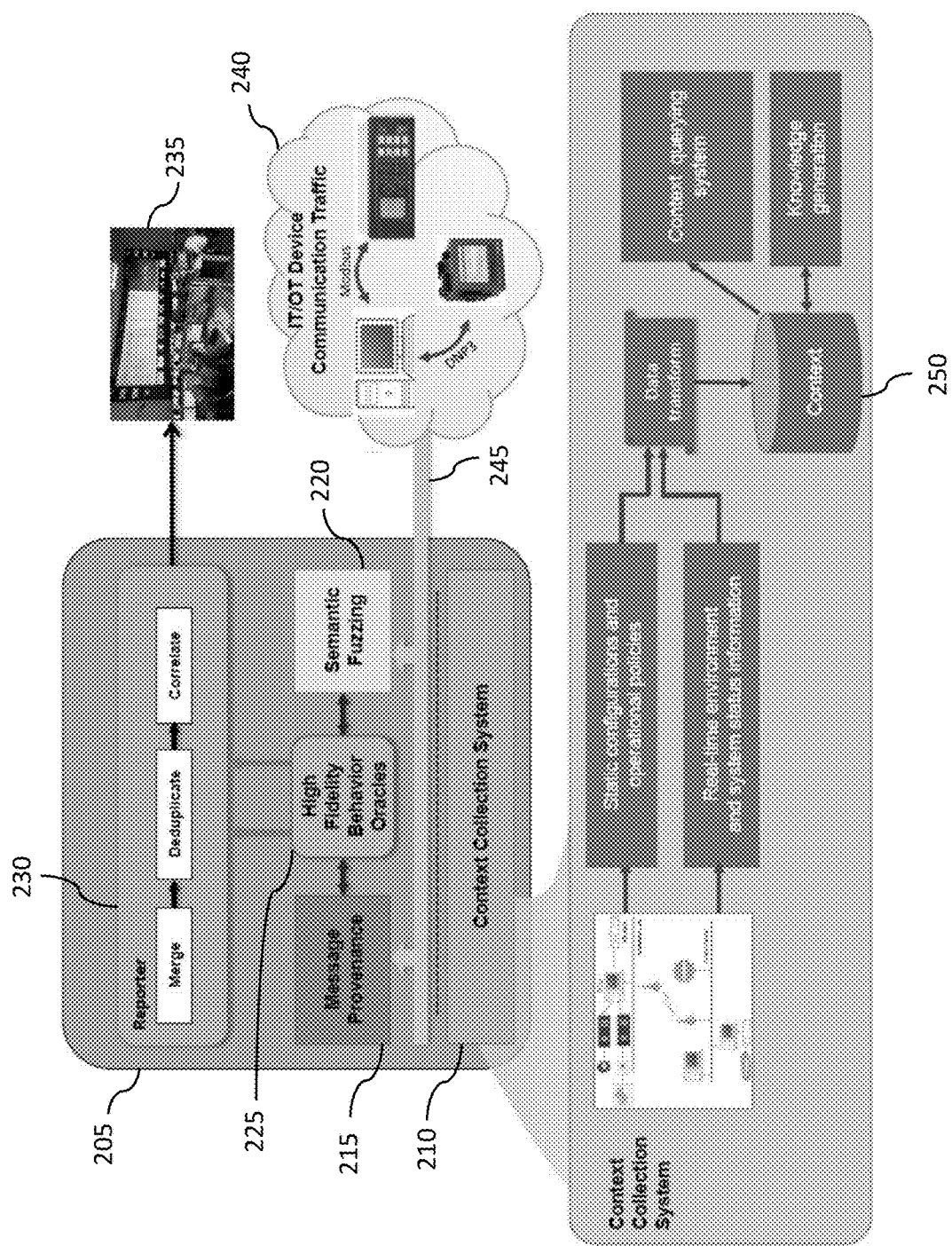
FIG. 2 depicts an exemplary architecture for a system for detection of and protection from subtle malicious messages. The capture of global context information provides an informed basis for encoding, representing, and querying the actual legitimate state of a specific system being protected (such as an energy system). The context system supports the detection techniques of message provenance and semantic fuzzing and informs the operation of a collection of high-fidelity oracles that emulate various aspects of ICS equipment behavior and physical properties.

A detailed exposition of technical components of the intrusion detection system begins with the illustration of the overall exemplary architecture shown in FIG. 2, which depicts a multi-layered approach for detecting catastrophic global state shifts induced by locally acceptable commands. Each component is described below, and detailed in the sub-sections that follow.

The context collection system (CCS) 210 of the intrusion detection system 205 captures the interrelated cyber and physical contexts that enable the detection of legitimate messages and commands that could degrade the energy system. The configuration settings, operating conditions, and other features that make up the context are shaped by customer demand, service area, facility size, fuel source, type of equipment, manufacturer of equipment, age of system, regulations, environmental factors, geographical distribution, and many other factors. The context may be assessed both a priori by analyzing its static components as well as in real-time. Context data can be transformed into one unified format which is further refined such that it can be stored in one or more databases 250 and queried by other components.

The message provenance component 215 and semantic fuzzing component 220 use the context information, together with a set of components that faithfully model system behavior (i.e., behavior oracles), to determine when the monitored energy system starts to exit its normal operational envelope. Behavior oracles, or simply oracles, may be independently-established models of system behavior with varying degrees of cost and fidelity. Oracles may receive actual or hypothetical control messages, and parameters regarding the system or its current or past state (if not already known by the oracle), and provide information on a future state (such as a prediction of an operational outcome). As further discussed below, behavior oracles may be implemented using hardware, software, or a combination thereof.

Intrusion detection system 205 may begin by modeling the interactions between devices on different protocols at a system level. This modeling approach is particularly relevant for attacks in which correlated sequences of messages can lead to a physical destruction of equipment. The message provenance component 215 builds models of normal behavior for the groups of connections established in the network (not just the independent content of single messages). These models can be used to detect misuse in the history of commands up to the current point, and also to predict the evolution of the state in response to command patterns.

The semantic fuzzing component 220 may then use both the attacker (modeled by a history sequence of control messages up to the current point) and the current state of the system as a concrete seed for prediction of potentially harmful future sequences. In certain configurations, a collection of highly-tuned sensors that will be referred to as behavior oracles can be used to predict possible physical harm when searching the space of legal message sequences. The output of this overall collection and introspection system is threat information that relates to both anomalous message sequences and estimated failure state.

The reporter component 225 may refine the signal received from the previous layer by merging, de-duplicating, and correlating the threat information, capturing it in the STIX/TAXII (threat intelligence) format, and sharing it with an Information Security Operations Center (ISOC) 230. Following standards that are already adopted can enable rapid ingestion and use of threat intelligence by other organizations.

Context Collection

Successfully leveraging context information is challenging due to the richness of the data that can and should be collected. As an example, in the energy context, an Energy Delivery System (EDS) can be thought of as a network of processes, where each process includes physical components (for example, valves, relays, rotors) and communicating nodes (e.g., programmable logic controllers (PLCs), Intelligent Electronic Devices (IEDs)) that transfer data to monitor and control these elements. As events and phenomena occur in the physical space, they influence particular behaviors in the cyber space, and vice versa. For example, when monitoring a process' power flow, the data polling rate dictates the traffic's temporal behavior, observable in the cyber context via inter-arrival time between messages. An EDS thus offers rich contextual information at both the cyber and physical levels, as well as a contextual cyber-physical relationship governed by the state of the process.

Furthermore, the context collection system can collect both static and dynamic data for a more comprehensive view of the actual system properties under live operation. This "behavior" loosely defined can offer the foundation of an independent data source for checking the semantics of input data and commands against this model of the specific properties of the system. Static physical context comprises the fixed constraints of the system, such as the critical ranges and limits of components and processes that delineate the safe/unsafe operation at the physical level. The static cyber context includes the defined network configurations like permitted protocols, permitted message types, and fixed network topology. The dynamic context, on the other hand, captures the system's status during operation in real-time. This context includes the condition of the process (e.g., pressure, power level, temperature) and the transient communication patterns (e.g., message rate, observed messages, transmitting nodes).

Figure 3:
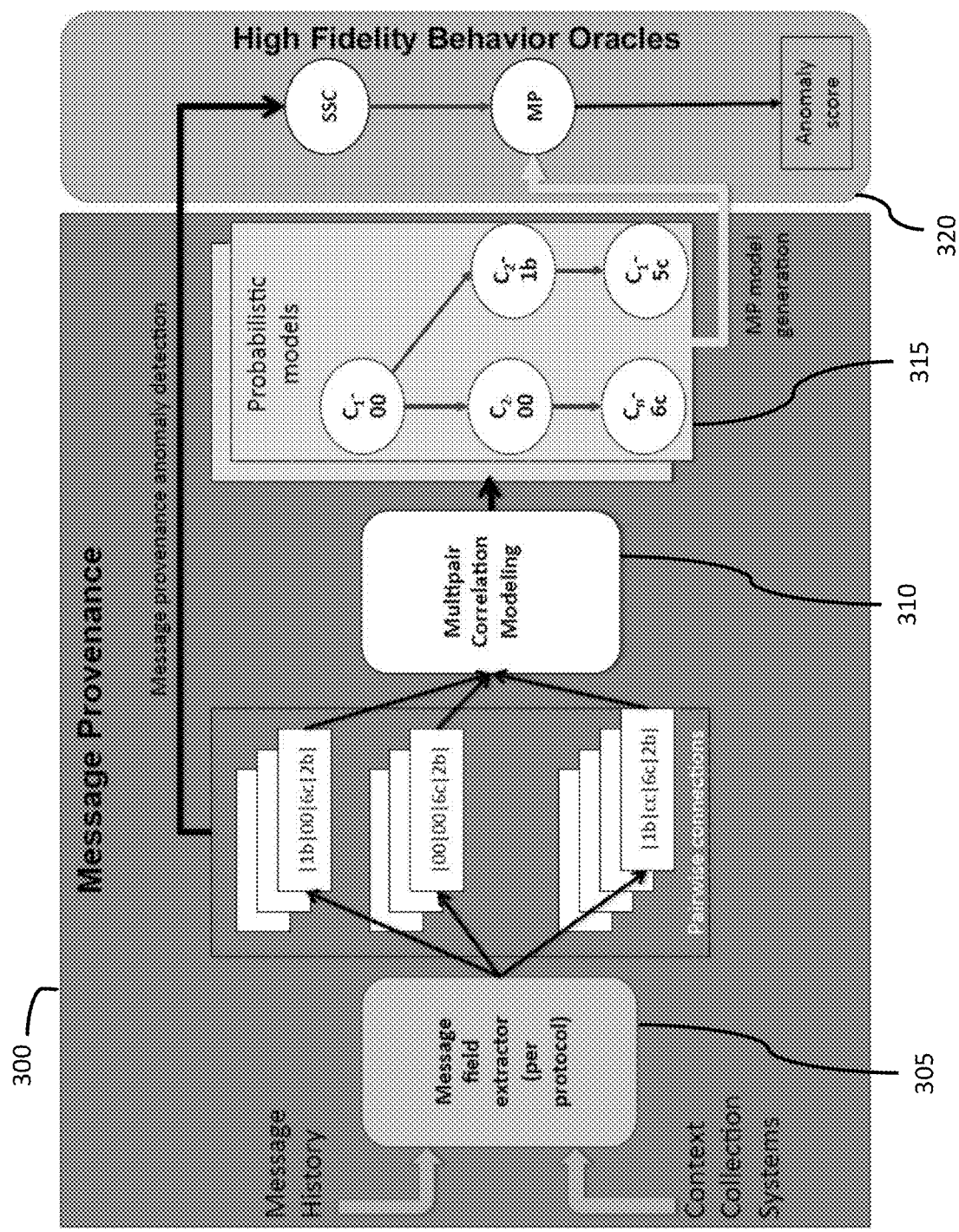
FIG. 3 provides an overview of an exemplary message provenance system. Messages may be extracted for each connection pair and each protocol. Correlation between different connections can be extracted, and probabilistic models derived for the linked connections. The models are used by the behavior oracle(s). In a testing phase, new message sequences may be fed to the oracle hierarchy to determine an anomaly score.

Plant systems (e.g., PLCs, Distributed Control Systems (DCSs), Supervisory Control and Data Acquisition System (SCADA), and Data Historian) can be leveraged as sources to collect physical context. For example, integrating with existing platforms can facilitate the collection of information including process-level actions (e.g., start-up procedures), physical element status, and alarm history. For collecting cyber context, a network flow analysis tool, such as SRI's "SRIFlow" (http://sriflow.csl.sri.com/), may be used to discover enabled protocol features, flow paths, and other communication information. Because there is likely a large volume of information for context, efforts focus on actionable information that is discrete, timely, predictable, and allows for easy evaluation. Table 1 below provides an example context for a notional process. To identify the most relevant context features, feature extraction and selection methods, such as Principal Component Analysis or Fisher Score, may be used to find the features that provide the best accuracy for the models being developed.

no such conversation takes place on an island: requests/replies between one pair of devices will be influenced by states created through communications between different pairs. To capture this behavior, the exemplary multi-step process depicted in FIG. 3 may be used.

In a first step, a message field extractor 305 may be used to safely isolate the relevant contents (fields) of the messages using, for example, a LangSec-based (i.e., Language-theoretic Security) parsing approach. In the ICS context, the most common communication configuration is the master/slave pattern. The master sends commands (with parameters) to the slave, and the slave responds to the commands. The exchange of these command and response pairs depends on both the internal state of the devices and the different operational modes. After unpacking the message contents, a

| | Cyber Context | | | | | | |
|---|---|---|---|---|---|---|---|
| | Static Context | | | Dynamic Context | | | |
| Message Flow | Source | Dest. | Msg Type | Ave Req. Rate | Ave Resp. Time | Registers | Ave Data Bits/Msg |
| Msg Flow 1 | SCADA | PLC1 | Modbus (FC1,3,16) | 500 ms | — | 3202, 4200, 4282 | 80 |
| Msg Flow 2 | PLC1 | SCADA | Modbus (FC1,3,16) | — | 100 ms | — | 224 |
| Physical Control | | | | | | | |
| Process Variable | Min limit | Max Limit | Target | Sampling Interval | Operating Min | Operating Max | Operating Average |
| Pressure | 80 mbar | 120 mbar | 100 mbar | 200 ms | 95 mbar | 150 mbar | 100 mbar |
| Control Element | Min limit | Max limit | Setpoint | Setpoint Change Rate | Operating Min | Operating Max | Operating Average |
| Rotor (Freq. Converter) | 500 rpm | 100k rpm | 65k rpm | 2 per min | 60k rpm | 75k rpm | 65k rpm |

Table 1 provides an example of context for a rotor control process. For a process stage, P1, the SCADA system reads the measured pressure and sends setpoints to a PLC controller. The PLC compares the measured pressure and controls the rotor frequency converter as required to match the pressure to the setpoint. The SCADA system (master) sends Modbus request messages to the PLC controller (slave) to query the measured values and to change set points, while the PLC controller sends response messages containing the measurements or status of the requested change.

Message Provenance

An ICS network may implement multiple protocols, and even a single device may interact with other nodes using several different protocols. Messages exchanged between one pair of devices is often correlated to other communicating pairs, and therefore could have an impact on them. A current message can be triggered by a series of events that extend, temporally and spatially, far beyond the previous message in the same sequence. Message provenance aims to understand and model these complex relationships. In furtherance of this, the intrusion detection system may model the device interactions at the system level. This system-level provenance model is important for detecting attacks where sequences of messages between multiple node pairs can lead to physical destruction of equipment.

Isolated pairwise sequences of reply and requests in an ICS can be probabilistically modeled with high accuracy. However, for a system at the scale of large energy ICSs, e.g., multipair correlation modeling component 310 may attempt to capture the correlations between multiple pairwise connections across the network. The result is a probabilistic model 315, based on the techniques detailed below.

Probabilistic Modeling: In contrast to enterprise systems, ICSs (including energy delivery ICSs) tend to exhibit a more constrained behavior. ICS systems often have fixed topology, and their specialized functionality often exhibits regular communication patterns. Moreover, ICS communication protocols may be simple and not very diverse each industry sector has traditionally used a few standard or recognized communication protocols. In the electric power systems, Modbus, IEC (International Electrotechnical Commission) 60870-5-104, IEC 61850, and DNP3 (Distributed Network Protocol) are prevalent (see IT/OT device communications traffic 240 in FIG. 2).

Figure 4A:
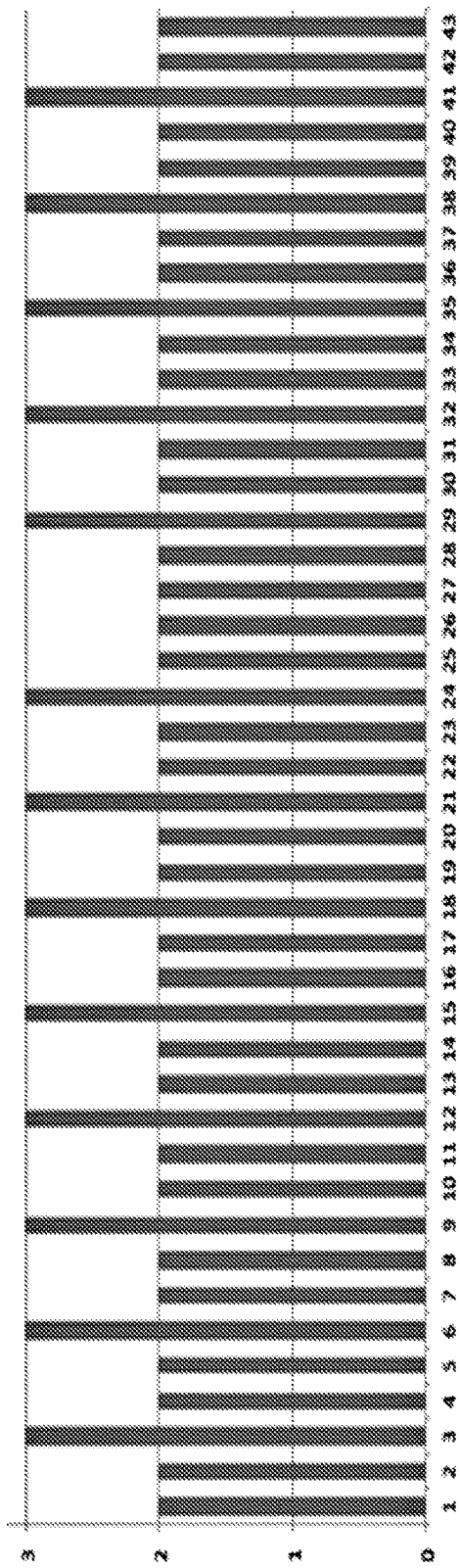
FIG. 4A provides an example of a regular sequence of commands pattern. The y-axis presents the command type and the x-axis the index of each command.
Figure 4B:
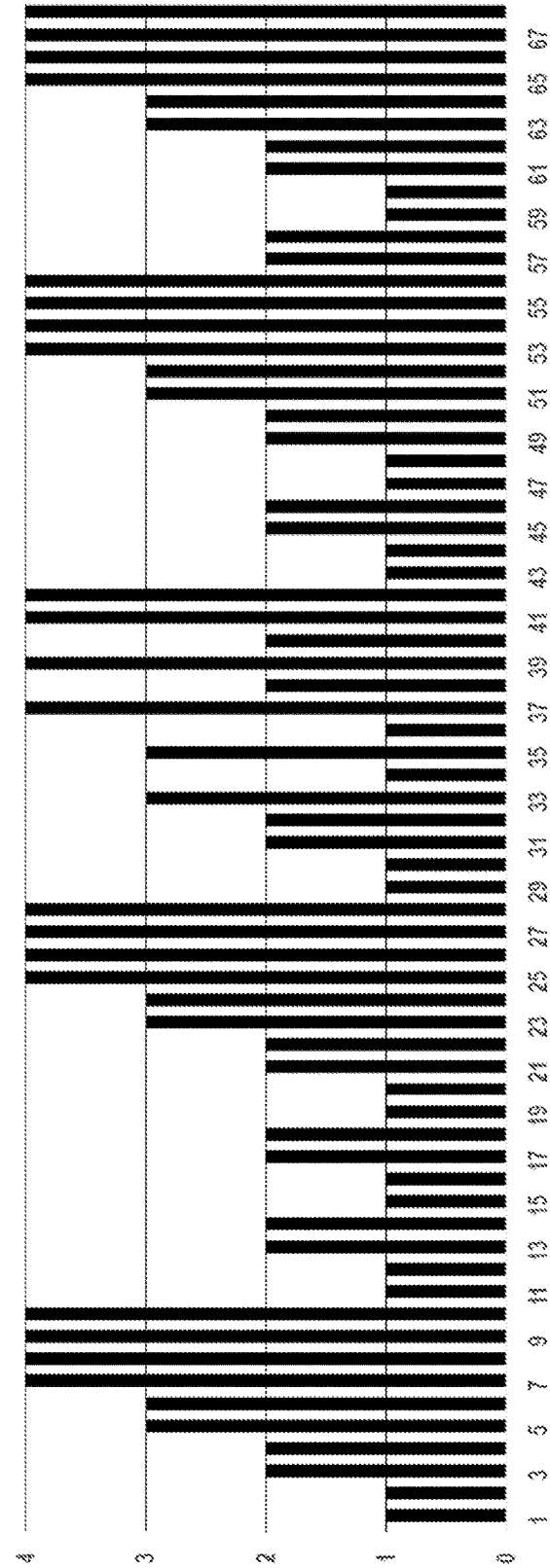
FIG. 4B provides an example of a relatively less-regular commands pattern. As with FIG. 4A, the y-axis presents the command type and the x-axis the index of each command.

To model message sequences, the intrusion detection system may consider the sequences of requests and replies generated by regular communication patterns. The probability of a command (or data) can be approximated, given each history sequence, facilitating the prediction of the next sequences of messages. FIGS. 4A and 4B present examples of command sequences for different devices with regular (FIG. 4A) and less regular (FIG. 4B) patterns. These examples provide patterns captured for individual devices and connections communicating over Modbus.

The goal is to learn the hidden pattern from a sequence of commands (or data such as control parameters). Given, for example, the following sequence of elements: $<\sigma_1, \sigma_2, \sigma_1, \sigma_2, \sigma_3, \sigma_3, \sigma_1, \sigma_2, \sigma_1, \sigma_2, \sigma_3, \sigma_3>$, the message sequence can be modelled as a first-order Markov chain, that is:

$$P(\sigma^{(t)}|\sigma^{(1)},\ldots,\sigma^{(t-1)}) = P(\sigma^{(t)}|\sigma^{(t-1)}) \quad (1)$$

The Markov chain model can detect certain abnormal subsequences such as $<\sigma_7, \sigma_3>$, or $<\sigma_2, \sigma_2>$, since those have never appeared in the sequence. However, it is not a good fit for modeling the normal subsequences. For example, $P(\sigma_1|\sigma_2) = P(\sigma_3|\sigma_2) = 0.5$, although $<\sigma_2, \sigma_1>$ and $<\sigma_2, \sigma_3>$ are still legitimate subsequences. However, a Markov chain of order 3 (or more) would learn the above normal subsequences without any ambiguity.

If a sequence of elements is generated by an underlying pattern and exhibits no noise, there exists a minimum order, m, for a Markov chain that allows for the prediction of the probability of an element by simply looking at the m most recent elements. The challenge is to build such a model even in the presence of noise, such as legitimate variations from the base pattern due to missing, out-of-order messages, and/or sporadic tasks. To address this challenge, Probabilistic Suffix Tree (PST, or Prediction Suffix Tree), which uses a variable-order Markov model representation, may be used. Intuitively speaking, a PST learns a set of subsequences of different lengths, e.g. $<\sigma_1>$, $<\sigma_2, \sigma_3>$, each of which can be a significant indication of the next element. This facilitates efficient calculation of the probability of the "next" element, without having to look back through all, or a pre-defined length, of the history. That is, $$P(\sigma^{(t)}|\sigma^{(1)},\ldots,\sigma^{(t-1)}) \sim P(\sigma^{(t)}|\sigma^{(t-1)},\ldots,\sigma^{(t-k)}) \quad (2)$$

for some k that varies depending on $\sigma^{(t-1)}$, $\sigma^{(t-2)}$ and so on.

Consider, for example, the case where four normal Modbus servers (A, B, C, D), are polled by one Modbus client. The polling frequencies for the four Modbus servers are all different (for example, 0.5, 1, 5, and 10 seconds, respectively). The fact that the Modbus client polls the different servers with different frequencies would be captured in the context information, enabling determination of the fact that there is a correlation link between the different connections. If one of the connections is delayed, the following connections would also be delayed; if sequences in one changes, they perturb the whole high-level sequence.

In the alternative, the intrusion detection system may use neural networks, such as recurrent neural networks (RNN) or other deep learning approaches, for modeling and predicting the message sequences. RNNs, for example, are specifically intended for learning sequences of events, but require more training data then PSTs.

Role and Integration: The global probabilistic models that are the output of the message provenance layer can be used by the intrusion detection system in at least one of two main ways. First, a model can directly serve as an anomaly detection mechanism operating on the history of commands received so far, and raising an alert if the sequence deviates from the learned norm. This is already a departure from current practices, given that the models operate at a system-side scale. However, to enhance the ability to detect attacks by looking into the future, and predicting potentially harmful command sequences as they unfold, a probabilistic message provenance model can serve as an oracle, and predict harmful effects on the system based on the current context and in response to a sequence of future commands. This will be further discussed below in the section detailing the operation of behavior oracles.

Semantic Fuzzing

The semantic fuzzing component is an exemplary detection mechanism that simulates "speculative execution" of message sequences between ICS devices. This novel technique generates and tests candidate message sequences that appear normal and legal, but whose effect is likely malicious. It may operate independently of actual target devices without impacting their operation. This approach is complementary to the anomaly detection performed by the message provenance subsystem (message provenance tests whether currently-observed message sequences are consistent with the learned model of device interactions, and semantic fuzzing seeks to forecast the future impact of possible follow-on message sequences). Semantic fuzzing is, in a sense, an attempt to peer into the future and anticipate how subsequent messages may impact the system and cause it or its subcomponents to drift closer to their operational edge (i.e., closer to the upper/lower bounds of the set of operational parameters that are deemed acceptably "safe," or otherwise behaving in a manner that is unacceptably risky in terms of potential damage).

For achieving early detection of such slow state shifts, exemplary embodiments analyze more than just the past history of commands and inputs, but also extrapolate commands and inputs into the future. The system is able to co-opt the attacker as an oracle to help drive a fuzzing process that searches the space of normal message sequences and evaluates the outcome of sending those sequences to the intrusion detection system's set of High Fidelity Behavior Oracles (320, FIG. 3), thereby taking full advantage of this collection of (a) real, (b) simulated, and (c) theoretically modeled systems.

Semantic fuzzing proactively behaves like an attacker in the sense that it adopts attacker goals with respect to physical disruption of certain pieces of equipment. A collection of attacker strategies may be encoded as part of the search process. These strategies are domain-specific patterns for generating unanticipated sequences of messages that destructively interfere with normal operation or the physical integrity of the energy system. For example, messages could rapidly oscillate between two legal but incompatible settings in order to wear out moving parts or build up friction, pressure, temperature, stress, or strain. Such attack strategies provide templates for achieving certain types of goals, but they are not specific enough to encode as a misuse signature, nor is it clear how to assert that any particular message sequence is an instance of an attacker strategy (modulo an approach like the collection of behavior oracles). In other words, the presumption of the existence of valid attacker strategies for breaking or disabling equipment is not an admission that one can somehow a priori guard against these strategies merely by writing a signature for a particular message sequence.

Figure 5:
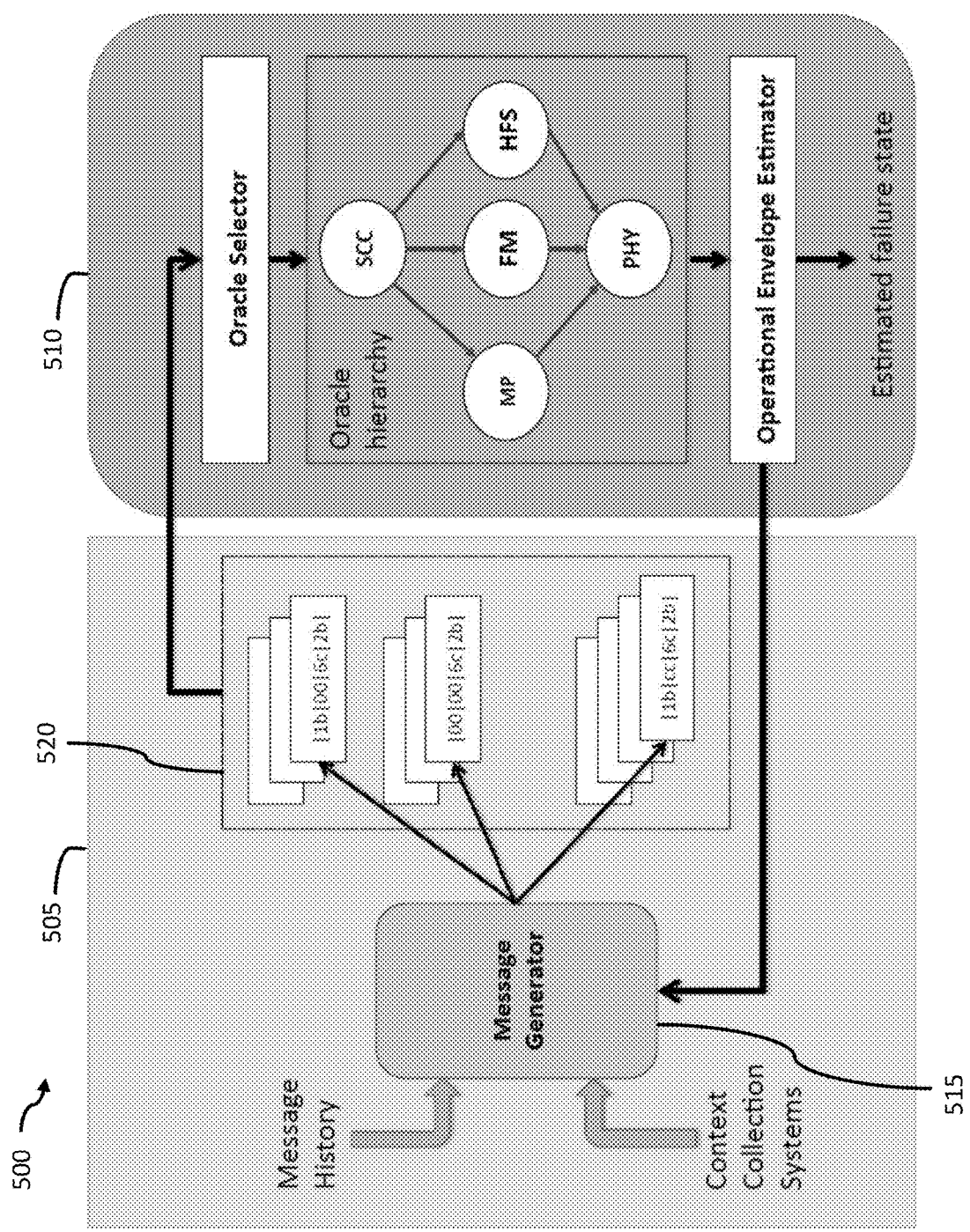
FIG. 5 provides an overview of an exemplary semantic fuzzing component. A message generator generates possible message sequences based on the current context, state, and message history. These messages are tested against the behavioral oracles to determine sequences that induce drift toward a failure state.

Approach and Architecture. With this insight in mind, a history sequence of per-device control messages may be used, together with the current state of the system (the context), as a concrete seed for prediction of future sequences that have the potential to cause harm to the system. The semantic fuzzing component ("fuzzer") can use this seed to synthesize sequences of valid messages, and then evaluate them against a hierarchy of Behavior Oracles. The oracles (discussed below) estimate the impact of a sequence on the system, reporting any suspect behavior to the user, while also reporting this information back to the message generator so that it can refine its search strategy. The overall architecture of the semantic fuzzing framework 500 is shown in FIG. 5, with a semantic fuzzer 505 and high fidelity behavior oracles 510. Semantic fuzzing can leverage the unique properties of the domain to constrain and inform the search.

Message Generator. Fuzzing traditionally refers to feeding (randomly generated) test data to the system under test in order to investigate its response. The message generator 515 may use semantic fuzzing as a smarter and more effective way to test a system on a diverse set of inputs. Exemplary embodiments of the message generator 515 use context information, along with the formal specification of the network protocols, as a formal system description that allows the message generator 515 to generate sequences of valid messages 520 (as opposed to random input data). The formal system description may be expressed, for example, with a formula ValidMessages in a suitable logical theory, and can then be efficiently solved by a satisfiability modulo theories (SMT) solver (such as SRI's "Yices"—http://yices.csl.sri.com/), where a solution to the formula corresponds to a sequence of valid messages.

This sequence of messages (the solution) can then be evaluated against the intrusion detection system's collection of oracles to estimate how close the evolution of the system will be to a failing state. Furthermore, the oracles return a set of feedback tokens to the message generator, as a logical formula OracleFeedback, that describes how this particular sequence should be changed in order to drive the system even closer to a failing state. This additional information is then passed on to the SMT solver that can solve for the adapted constraints:

$$\text{V{\scriptsize ALID}M{\scriptsize ESSAGES}}(m_1, \ldots, m_H, x_1, \ldots, x_H) \wedge \text{O{\scriptsize RACLE}F{\scriptsize EED}} \text{{\scriptsize BACK}}(x_1, \ldots x_L) \quad (3)$$

A solution to the above is a new message sequence that takes into account the oracle feedback, and makes the message generation failure-driven and intrinsically diverse. This technique for test case generation and diversification, a sort of concolic testing (a portmanteau of concrete and symbolic), can be very useful in finding malicious sequences of messages.

Behavioral Oracles

While other modules of exemplary implementations of the intrusion detection system are responsible for observing the system and generating potential malicious behaviors, a set of behavioral oracles evaluates the potential damage that such behaviors can inflict on the physical parts of the system. The oracles can simulate the physical device characteristics at increasing fidelity levels, and have two main responsibilities. First, given a concrete sequence of messages sent to a particular device, an oracle can predict whether there would be a negative physical impact on the device had this sequence been executed. If the messages are deemed critically harmful, then a definite alarm is raised by the intrusion detection system. Otherwise, in order to improve the coverage that the intrusion detection system can provide, the oracle can also provide feedback on potential changes that could make the given message sequence even more harmful. The intrusion detection system may provide a hierarchical set of oracles, with ranging fidelities (and corresponding computational complexity). Then, at runtime, depending on, for example, the timing constraints (such as how long it would take for damage or disruption to occur, a preset time limit available for assessing risk, etc.), the costs and risks of reaching an incorrect risk assessment (e.g., how devastating or disruptive would the malicious messages be), etc., a subset of these oracles may be selected so as to maximize the simulation fidelity. Example oracles that may be included in various configurations of the intrusion detection system are listed below.

Simple Static Context (SSC). In exemplary embodiments, an SSC oracle is a linear collection of facts about the protected equipment. It operates by comparing the values in the message sequence, and checking if they are in the allowed range (such as the equipment manufacturer's stated limits or the configured limits by the asset owner). For example, if the rotors of a centrifuge are running at $\omega_c=75, 000$ rpm, and a command message requires acceleration to $\omega_r=80,000$ rpm, which is outside of the device limits, then the SSC can report a potential violation. Conversely, if the message requests centrifuge deceleration instead, the oracle could provide as feedback, for example, the formula $\omega_r>80, 000$. The static context information can also be complemented with an estimated safety envelope computed over the past messages. The safety envelope also contains ranges for the values in the message sequences, but with values more conservative than the configured limits, and, in order to reduce false positives, those can be used instead.

Learned Message Provenance (LMP). An LMP oracle uses the probabilistic models described earlier to capture how (possibly not directly related) devices communicate or react to typical events in the monitored system. For example, LMP can isolate the message frequency between two nodes A and B as an emerging property of the system, and learn that the mean of the frequency f is 60 minutes, with a standard deviation of one minute. Given a message sequence $m_1, \ldots, m_{100}$ of 100 messages over a span of 120 minutes, for example, the LMP oracle may report a change from every 60 minutes to every 30 minutes as an anomalous behavior. On the other hand, if anomalous behavior is not detected, LMP may provide as feedback that the sequence might deviate from the expected frequency if another message (say, $m_4$) between nodes A and B is present. Symbolically, this can be expressed by the formula $$(m_4 \cdot src = A) \wedge (m_4 \cdot dst = B).$$

Formal Model (FM). An FM oracle maintains mathematical models of the physical dynamics for devices where this model is either readily available (as part of the device specification), or can be easily described. Formal models can be constructed for discrete controllers or devices with simple models (e.g., equations relating time, speed, acceleration, etc.). Compared to more computationally expensive oracles below, the formal model is a more efficient mathematical abstraction that, in addition, also has the means to provide precise symbolic feedback for improving coverage of possible attacks.

High-Fidelity Simulator (HFS). An HFS oracle is composed of a heterogeneous set of physical equipment simulators. These simulators range from basic ones that already exist for deployment compatibility testing, to modified simulators that can model dynamic physical interactions (e.g., temperature, pressure, stress, strain). Creating and managing an HFS might be computationally expensive, but the benefits are almost perfect high-fidelity results without the risk of breaking real equipment. In an example, starting from the current process context in the simulator, and observing the rotor parameters within Process P1 according to values (4,000, 80,000, etc.) in the arriving message sequence, the HFS can directly predict the impact of changing rotor speeds on the operational speed and process pressure. Oscillating the rotor speed would eventually degrade the rotor, cause it to stop, and raise the process pressure beyond the operational envelope. Using the HFS helps the intrusion detection system predict the changes trending towards an unsafe condition with each incremental message, even before the full sequence of messages is operationalized.

The simulator is capable of modeling emergent interactions/emergent properties based on physical parameters such as heat, temperature, pressure, strain, stress on all metals and pieces, etc. An existing simulator may be enhanced, in various configurations, to model a few categories of emergent properties, then take the current system state (history) plus current message, and generate (i.e., search) strings of legal values and parameters in messages (i.e., the search is bounded by the requirement for legal values and parameters). Messages could be diverted to not only a high-fidelity "honeypot," but also an automated diversity farm of honeypots, who would vote if actions would harm them.

Physical Devices (PHY). A PHY oracle is composed of a set of backup devices that correspond with relatively high-fidelity to the equipment in the target network. It is a type of honeypot whose physical properties approach that of the target network and may thus represent a significant cost to set up (and pass attacks to, risking breakage). It may be the oracle of last resort for tie-breaks, or where previous sets of sensors cannot agree on a decision. While the PHY is ultimately the most precise oracle, its latency and cost position place it at the bottom of the oracle hierarchy exemplary embodiments. It may be decided that PHY will not be used except as a last resort to evaluate, for example, message sequences that all other applicable oracles have flagged as dangerous.

Figure 6:
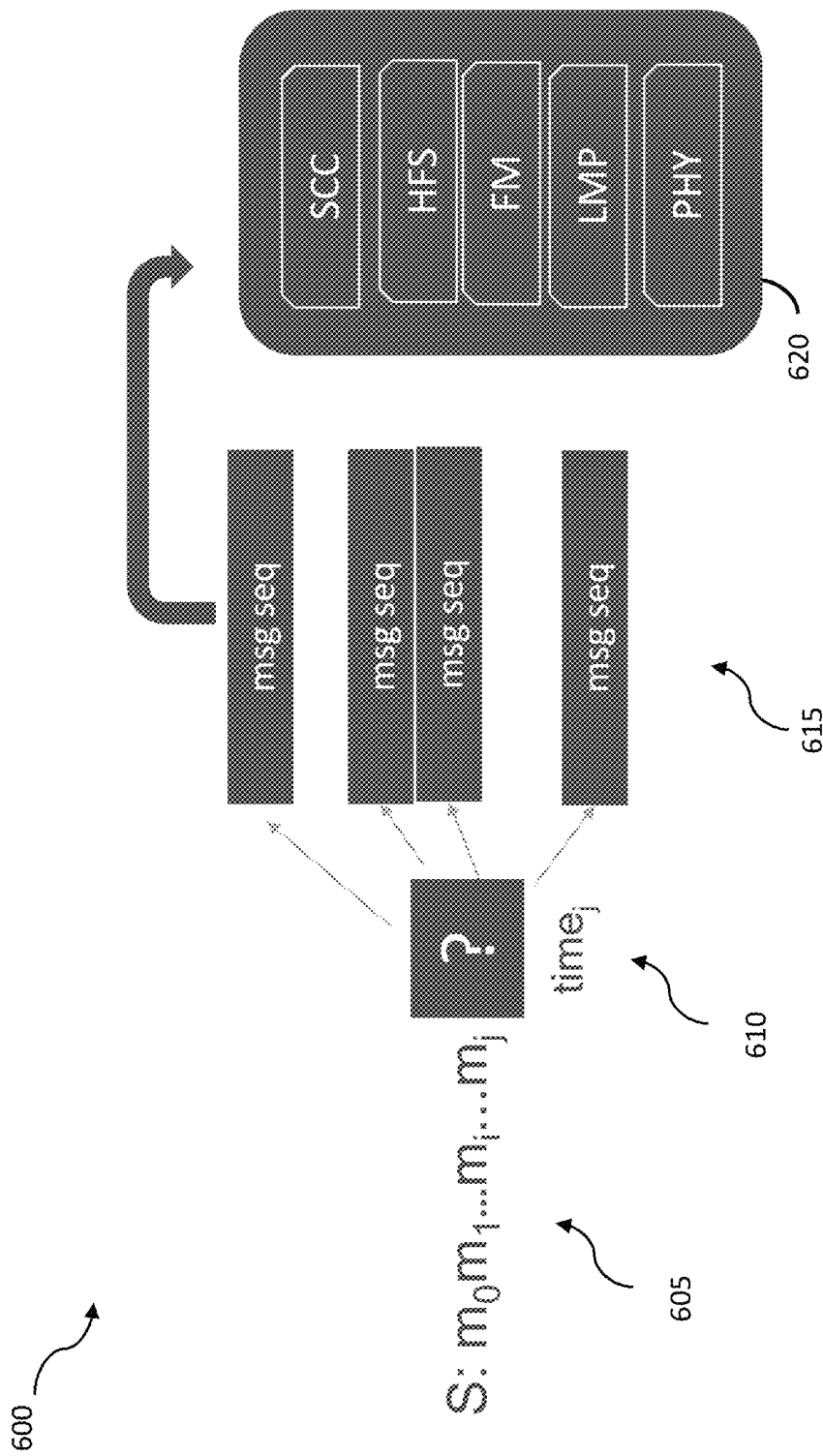
FIG. 6 is a depiction of an exemplary semantic fuzzing framework feeding message sequences to behavior oracles.

FIG. 6 provides a conceptual representation of certain exemplary implementations of the semantic fuzzing operation 600. A sequence of actual messages ("S") observed in the system thus far includes $m_0, m_1 \ldots m_i \ldots m_j$ 605 at time$_j$ 610. Multiple different message sequences ("msg seq") 615 may be generated based on the legal messages observed. The message sequences 615 are fed to a cascade of oracles 620 that are able to provide an independent cause/effect evaluation of the sequences 615. (It is noted that time is a hidden variable; the sequence is executed within a time window.) The oracle types depicted in the example are: (1) Simple Context Comparator (SCC), which makes simple comparison on context parameters; (2) High Fidelity Simulator (HFS), which simulates the environment and illustrates the impact of the message sequences on the system's normal operation; (3) Formal Model (FM), which models the context as a set of constraints on different system properties; (4) Learned Message Provenance (LMP), which models and predicts the next normal sequences of operations; and (5) Physical (PHY), which uses real physical equipment on which the impact of the message sequences can be directly observed.

As a simple attack example, a dam includes a sensor that reads water level and a valve that can be opened and closed. An attack may send a series of Modbus messages with OP_CODE 0x05 with alternating open and close valve commands. (0XFF00 requests the coil to be ON, 0X0000 requests the coil to be off. All other values are illegal and do not affect the coil.) The valve breaks and overflows the downstream of the dam. The field values for OP_CODE 0x05 are valid; the message sequence is valid (open/close/open/close/etc.). The semantic fuzzing could easily predict the following sequences of messages. For example, the PHY, FM, and HFS oracles could detect the physical break in the valve. FM and HFS will have constraints on physical properties based on context, as discussed above.

Reporting

In exemplary embodiments, the threat information received from the message provenance and semantic fuzzing components may be merged, reduplicated, and correlated to generate threat intelligence that is packaged, for example, in STIX/TAXII formats. This information may also be shared rapidly with, for example, agencies, organizations, and first responders, such as the Industrial Control Systems Cyber Emergency Response Team (ICS-CERT) and the United States Computer Emergency Readiness Team (US-CERT) using TAXII, and may be used for correlation with activities in other utilities and sectors. Moreover, capturing the context information that is attached to the threat information, to provide richer information, would enable operators to develop effective remediation plans to avoid significant damage and understand the impact on the operational environment. A tool such as STIXViz (the STIX visualization tool), which is built specifically for STIX data, can be used to visualize the affected utility's device state, aiding cyber responders in their remediation activity.

Testing and Fine-Tuning

To test and evaluate exemplary implementations of the intrusion detection system, the metrics listed below may be used. This list of metrics helps characterize the behavior of the protection.

Reduction of risk level. In the energy ICS scenario, the intrusion detection system seeks to reduce the risk of exposing ICS energy delivery devices to certain types of subtly malicious control messages. Since devices operate in a mode where they receive command and control messages on a regular basis, no simple firewall technology or whitelist can provide protection. Instead, some form of deep introspection should be performed on the traffic in these environments. Reduction of risk for this class of attacks may be measured using, for example, the security posture score (e.g., number and type of devices exploited) in the presence of the intrusion detection system and compare this to the same scenario without the intrusion detection system running. The output metric of semantic fuzzing can be particularly helpful to estimate the "distance" from a failure state for given devices and identify a "path" of messages needed to move there, which is directly relevant to system risk.

Detection efficacy. Exemplary implementations of the intrusion detection system are an intrusion detection system tuned to a particular class of attacks in a specific domain. This specificity gives it several advantages in demonstrating the ability to detect attacks (to support the first metric above, reduction of risk level); this detection ability can be measured in several ways: (1) ability for message provenance to detect anomalous communication patterns through measuring false positive and true positive rates; (2) ability of message provenance to detect the occurrence of physical events (whether malicious or not), which can be done as a type of ex post facto check on the sensitivity of message provenance to "new" correlated message sequence groups; and (3) completeness and power of discovered message sequences from semantic fuzzing (subsidiary metrics being resources taken by the semantic fuzzing search to identify sequences of particular lengths and impact as measured by the behavior oracles).

Nature and amount of context information collected. One significant temptation for many anomaly detection systems is to attempt to gather and model all information; this tends to be unfeasible for any significantly-sized system and does not necessarily increase detection accuracy. The exemplary intrusion detection system instead may focus on gathering context information that has a direct bearing on the (1)

patterns of legitimate communication and (2) the physical properties of equipment most directly related to failure or disruption. During testing, the context collection system may track the nature and amount of context information collected. Experiments may be performed that assess the impact on detection under varying levels of collected context information (low/medium/high). This can be a useful metric because it helps asset owners assess how much configuration information they should gather in their particular environment to best tune the detection and intrusion detection system.

Exemplary intrusion detection systems discussed above reduce the risk of exposing devices to a certain type of subtly malicious control messages, and are able to provide low-cost deployment due to the lack of interference with the operational environment. This is because meaningful data and communications information can be collected in a non-intrusive way. Focusing on the interface between the cyber and physical layers, exemplary embodiments aim to prevent physical damage to equipment with potential cascading effects.

Equipment need not be patched, upgraded, or modified, since exemplary implementations of the system can be deployed alongside existing equipment. The architecture of exemplary intrusion detection systems is non-disruptive, and can achieve a balance between obtaining access to meaningful data and communications information. The intrusion detection may be deployed as a monitor of communications on an IT/OT subnet (which may be well-suited for certain legacy devices), or integrated within new equipment to leverage on-board and strongly compartmentalized computing capacity. Exemplary implementations do not depend on the nature of any specific equipment or protocol because they focus on modeling communication patterns, and detection does not depend on observing a specific feature of current attacks (such as a worm signature). Flexible deployment options also avoid obsolescence by either being incorporated into new equipment or co-residing on network broadcast medium with new or legacy devices. Moreover, the intrusion detection system aims to detect very complex attacks that can evade existing detection techniques; these attacks will become more prevalent in the future.

Because the intrusion detection system does not rely on signatures or updates, it is able to continuously capture the global context information and perform the message provenance detection and semantic fuzzing processes. This helps the system anticipate future trends in both attacks and equipment. Exemplary implementations have the deployment flexibility to instrument and monitor an IT/OT network at or near all known access points, whether wired or wireless; it can examine the sequence of network messages and complement traditional methods of authentication and authorization. The system can supplement the protection provided by standard strong authentication mechanisms by modeling and detecting the malicious use of legitimate command sequences (possibly issued by a principal with stolen credentials). That is, the system can protect against unauthorized access by detecting carefully crafted sequences of well-formed, legal messages that mimic an authorized behavior.

It is noted that operational control systems refer to any system involved in the control of the operation of one or more devices. Examples of such systems include industrial control systems (ICS), related to control systems and associated instrumentation used in industrial production (such as SCADA systems, DCSs, PLCs, etc.), often found in industrial sectors and critical infrastructures such as energy (e.g., electrical, water, oil, gas, etc.). Operational control systems include control systems used in manufacturing, such as systems that control the operation of one or more machines, instruments, industrial robots, etc. in, for example, a manufacturing plant. Further, operational control systems include systems involved in the control of one or more vehicles or other mobile machines, such as motor vehicles (e.g., cars, trucks, buses, etc.), railed vehicles (e.g., trains, trams, etc.), watercraft (e.g., ships, boats, submarines, etc.), aircraft (e.g., airplanes, drones, etc.), spacecraft (e.g., shuttles, satellites, etc.), or any combination thereof. Such vehicles include, e.g., autonomous cars and trucks, unmanned ground vehicles (UGVs), remotely operated underwater vehicles (ROVs) etc.), and unmanned aerial vehicles (UAV). The control systems may be involved in the operation of devices that are for personal, commercial, industrial, military, or other uses.

It is further noted that the "harm" to be avoided need not be limited to damage to a device or disruption to its operation or efficiency. The harm that may result may be to persons and property, whether in the vicinity of the devices or located remotely. For example, in control systems involved in manufacturing, the harm may not be to the actual machines and industrial robots, but to the products being manufactured (which may be defective, inferior, or otherwise not as intended). In the case of vehicles, for example, the harm may not be to the vehicle itself, but rather to passengers, cargo, and surroundings. For example, if a safety feature is disabled, rendered less responsive, or otherwise compromised, the vehicle itself may otherwise remain intact and undamaged (once proper control is restored), but the compromise in the safety feature (which may be relied upon by the driver who is not aware of the compromise) is harmful because it unnecessarily increases risks, even if a crash does not result.

The present invention has been described in terms of one or more preferred embodiments, and it should be appreciated that many equivalents, alternatives, variations, additions, and modifications, aside from those expressly stated, and apart from combining the different features of the foregoing embodiments in varying ways, can be made and are within the scope of the invention. In the above description, a number of specific details, examples, and scenarios are set forth in order to provide a better understanding of the present disclosure. These examples and scenarios are provided for illustration, and are not intended to limit the disclosure in any way. Those of ordinary skill in the art, with the included descriptions, should be able to implement appropriate functionality without undue experimentation. References in the specification to "an embodiment," "an example," "a version," "an implementation," "a configuration," etc., indicate that the embodiment, example, version, etc. described may include a particular feature, structure, or characteristic, but every embodiment, example, version, etc. may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated. The computerized functionality described above may be implemented in hardware, firmware, software, single integrated devices, multiple devices in wired or wireless communication, or any combination thereof. Computerized functions may be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory. In the drawings, specific arrangements or orderings of schematic elements may be shown for ease of description. However, the specific ordering or arrangement of such elements is not meant to imply that a particular order or sequence of processing, or separation of processes, is required in all embodiments. Further, some connections or relationships between elements may be simplified or not shown in the drawings so as not to obscure the disclosure. This disclosure is to be considered as exemplary and not restrictive in character, and all changes and modifications that come within the spirit of the disclosure are desired to be protected.

EXAMPLES

Illustrative examples of the technologies disclosed herein are provided below. An embodiment of the technologies may include any one or more, and any combination of, the examples described below.

In an example 1, an intrusion detection method for protecting against sequences of operationally valid control messages that in combination harm or disrupt devices in an operational control system includes the steps of: monitoring operationally valid control messages communicated in the operational control system to gather current contextual information which includes a set of physical constraints on control system properties; determining system-level correlations between control messages based on the contextual information; generating sequences of operationally valid control messages that would result in actual harm based on the system-level correlations; and reporting a threat when a harmful sequence of messages is identified.

An example 2 includes the subject matter of example 1, wherein the operational control system is a manufacturing control system that controls machines used for manufacturing products.

An example 3 includes the subject matter of example 1 and/or example 2, wherein the devices are vehicles.

An example 4 includes the subject matter of example 1, wherein generating sequences of operationally valid control messages includes using current messages as starting points and generating subsequent messages that are predicted to be harmful.

An example 5 includes the subject matter of example 1 and/or 2, further including evaluating harmfulness of the generated sequences of messages using one or more behavior oracles.

An example 6 includes the subject matter of example 1, 2, and/or 3, wherein the one or more behavior oracles evaluate harmfulness by determining whether the generated sequences of messages induce operational drift towards a failure state for one or more devices.

An example 7 includes the subject matter of example 1, 2, 3, and/or 4, wherein the behavior oracles used include a set of hierarchical oracles, and wherein a subset of the hierarchical oracles are used.

An example 8 includes the subject matter of example 1, 2, 3, 4, and/or 5, wherein at least two of the hierarchical oracles vary in computational complexity, and wherein the subset is selected based on timing constraints.

An example 9 includes the subject matter of example 1, 2, 3, 4, 5, and/or 6, wherein the behavior oracles used include a simple static context (SSC) oracle that is configured to compare a set of values in a message sequence against an allowable range for the set of values.

An example 10 includes the subject matter of example 1, 2, 3, 4, 5, 6, and/or 7, wherein the behavior oracles used include a high fidelity simulator (HFS) oracle that is configured to simulate the control system environment to determine effects of message sequences on normal operations.

An example 11 includes the subject matter of example 1, 2, 3, 4, 5, 6, 7, and/or 8, wherein the behavior oracles used include a message provenance oracle that is configured to predict subsequent sequences of non-harmful control messages.

An example 12 includes the subject matter of example 1, 2, 3, 4, 5, 6, 7, 8, and/or 9, wherein the behavior oracles used include a physical (PHY) oracle that is configured to use equipment to directly observe the physical effects of sequences of operationally valid control messages.

An example 13 includes the subject matter of example 1, 2, 3, 4, 5, 6, 7, 8, 9, and/or 10, wherein reporting a threat includes reporting anomalous message sequences or reporting an estimated failure state based on current messaging.

In an example 14, an intrusion detection system for protecting against sequences of operationally valid control messages that in combination harm or disrupt devices in an operational control system, includes a processor and a memory having instructions executable by the processor, causing the processor to: monitor operationally valid control messages communicated in the operational control system to gather current contextual information which includes a set of physical constraints on control system properties; determine system-level correlations between control messages based on the contextual information; generate sequences of operationally valid control messages that would result in actual harm based on the system-level correlations; and report a threat when a harmful sequence of messages is identified.

An example 15 includes the subject matter of example 13, wherein generating sequences of operationally valid control messages includes using current messages as starting points and generating subsequent messages that are predicted to be harmful.

An example 16 includes the subject matter of example 13 and/or 14, wherein the processor is further configured to evaluate the generated sequences of messages using one or more behavior oracles.

An example 17 includes the subject matter of example 13, 14, and/or 15, wherein the behavior oracles used include a set of hierarchical oracles that vary in computational complexity, and wherein the processor is further configured to select a subset of the hierarchical oracles based on timing constraints.

An example 18 includes the subject matter of example 13, 14, 15, and/or 16, wherein the behavior oracles used include a high fidelity simulator (HFS) oracle that is configured to simulate the control system environment to determine effects of message sequences on normal operations.

An example 19 includes the subject matter of example 13, 14, 15, 16, and/or 17, wherein reporting a threat includes reporting anomalous message sequences or reporting an estimated failure state based on current messaging.

In an example 20, an intrusion detection method for protecting against sequences of operationally valid control messages that in combination harm or disrupt devices in an operational control system includes the steps of: gathering contextual information by monitoring operationally valid control messages communicated in the operational control system, the contextual information including a set of physical constraints on control system properties; mapping message provenance by determining system-level correlations between control messages; using semantic fuzzing to generate predictive sequences of operationally valid control messages that would result in actual harm; evaluating harmfulness of the generated sequences of messages using one or more behavior oracles; and generating a threat report when a harmful sequence of messages is identified.

The invention claimed is:

1. An intrusion detection method for protecting against sequences of operationally valid control messages that in combination harm or disrupt devices in an operational control system comprising multiple devices, the method comprising:
   gathering, by one or more processors, current contextual information which includes a set of physical constraints on control system properties;
   determining, by the one or more processors, system-level correlations between different pairwise connections across the multiple devices based on operationally valid control messages and the current contextual information;
   generating, by the one or more processors and based on the system-level correlations, a history of message sequences between the devices of the operational control system, and the current contextual information, a plurality of candidate sequences of operationally valid control messages;
   determining, by the one or more processors, a subset of one or more candidate sequences of the plurality of candidate sequences of operationally valid control messages that would result in actual harm based on an operational effect to the operational control system from each candidate sequence of the plurality of candidate sequences of operationally valid control messages; and
   monitoring, by the one or more processors, the operationally valid control messages communicated in the operational control system and reporting a threat when a harmful sequence of messages is identified matching at least one of the subset of one or more candidate sequences of operationally valid control messages that would result in actual harm.

2. The method of claim 1, wherein the operational control system is a manufacturing control system that controls machines used for manufacturing products.

3. The method of claim 1, wherein the devices are vehicles.

4. The method of claim 1, wherein the generating the plurality of candidate sequences of operationally valid control messages comprises generating the candidate sequences of operationally valid control messages based on a specification of a network protocol.

5. The method of claim 1, further including evaluating harmfulness of a candidate sequence of the plurality of candidate sequences of operationally valid control messages using one or more behavior oracles.

6. The method of claim 5, wherein the evaluating harmfulness includes determining whether the candidate sequence induces operational drift towards a failure state for one or more of the multiple devices.

7. The method of claim 5, wherein the one or more behavior oracles include a set of hierarchical oracles, and wherein a subset of the set of hierarchical oracles are used for the evaluating.

8. The method of claim 7, wherein at least two hierarchical oracles of the set of hierarchical oracles vary in computational complexity, and wherein the subset is selected based on timing constraints.

9. The method of claim 5, wherein the one or more behavior oracles include a simple static context (SSC) oracle that is configured to compare a set of values in a message sequence against an allowable range for the set of values.

10. The method of claim 5, wherein the one or more behavior oracles include a high fidelity simulator (HFS) oracle that is configured to simulate an environment for the operational control system to determine effects of message sequences on normal operations.

11. The method of claim 5, wherein the one or more behavior oracles include a message provenance oracle that is configured to predict subsequent sequences of non-harmful control messages.

12. The method of claim 5, wherein the one or more behavior oracles include a physical (PHY) oracle that is configured to use equipment to directly observe physical effects of sequences of operationally valid control messages.

13. The method of claim 1, wherein reporting the threat includes reporting anomalous message sequences or reporting an estimated failure state based on current messaging.

14. The method of claim 1, wherein gathering the current contextual information further comprises polling one or more of the multiple devices to obtain the current contextual information.

15. The method of claim 14, further comprising capturing, in the current contextual information, different polling frequencies used to poll the one or more of the multiple devices.

16. The method of claim 14, further comprising measuring inter-arrival times between operationally valid control messages.

17. The method of claim 14, wherein the current contextual information further comprises one or more of (i) static physical context data, (ii) dynamic physical context data, (iii) static cyber context data, (iv) dynamic cyber context data, (v) any one or more of (i), (ii), (iii), (iv).

18. An intrusion detection system for protecting against sequences of operationally valid control messages that in combination harm or disrupt devices in an operational control system comprising multiple devices, the intrusion detection system including a processor and a memory having instructions executable by the processor, causing the processor to:
   poll one or more of the multiple devices to obtain current contextual information which includes a set of physical constraints on control system properties;
   determine system-level correlations between different pairwise connections across the multiple devices based on operationally valid control messages and the current contextual information;
   generate, based on the system-level correlations, a history of message sequences between the devices of the operational control system, and the current contextual information, a plurality of candidate sequences of operationally valid control messages;
   determine a subset of one or more candidate sequences of the plurality of candidate sequences of operationally valid control messages that would result in actual harm based on an operational effect to the operational control system from each candidate sequence of operationally valid control messages; and
   monitor operationally valid control messages communicated in the operational control system to report a threat when a harmful sequence of messages is identified matching at least one of the subset of one or more candidate sequences of operationally valid control messages that would result in actual harm.

19. The system of claim 18, wherein the instructions to generate the plurality of candidate sequences of operationally valid control messages further cause the processor to generate the plurality of candidate sequences of operationally valid control messages based on a specification of a network protocol.

20. The system of claim 18, wherein the instructions further cause the processor to evaluate a candidate sequence of the plurality of candidate sequences of operationally valid control messages using one or more behavior oracles.

21. The system of claim 20, wherein the one or more behavior oracles include a set of hierarchical oracles that vary in computational complexity, and wherein the processor is further configured to select a subset of the set of hierarchical oracles based on timing constraints.

22. The system of claim 20, wherein the one or more behavior oracles include a high fidelity simulator (HFS) oracle that is configured to simulate an environment for the operational control system to determine effects of message sequences on normal operations.

23. The system of claim 18, wherein the instructions further cause the processor to report anomalous message sequences or to report an estimated failure state based on current messaging.

24. An intrusion detection method for protecting against sequences of operationally valid control messages that in combination harm or disrupt devices in an operational control system comprising multiple devices, the method comprising:
- polling one or more of the multiple devices to obtain contextual information including a set of physical constraints on control system properties;
- mapping message provenance by determining system-level correlations between different pairwise connections across the multiple devices based on operationally valid control messages and the current contextual information;
- generating, based on the system-level correlations, a history of message sequences between the devices of the operational control system, and the current contextual information, a plurality of candidate sequences of operationally valid control messages;
- evaluating harmfulness of the plurality of candidate sequences of operationally valid control messages using one or more behavior oracles to determine a subset of one or more candidate sequences that would result in actual harm; and
- monitoring the operationally valid control messages communicated in the operational control system to generating a threat report when a harmful sequence of messages is identified matching at least one candidate sequence of the subset of one or more candidate sequences of operationally valid control messages that would result in actual harm.

* * * * *